United States Patent

Gilmore

[11] Patent Number: 5,487,462
[45] Date of Patent: Jan. 30, 1996

[54] EXTENDABLE CONVEYOR WITHOUT BASE UNIT

[75] Inventor: Phillip J. Gilmore, Healdsburg, Calif.

[73] Assignee: Rapistan Demag Corporation, Grand Rapids, Mich.

[21] Appl. No.: 295,947

[22] Filed: Aug. 25, 1994

Related U.S. Application Data

[62] Division of Ser. No. 131,198, Oct. 1, 1993, Pat. No. 5,423,413.

[51] Int. Cl.⁶ .................................................. B65G 15/26
[52] U.S. Cl. ........................................... 198/594; 198/812
[58] Field of Search ................................. 198/588, 594, 198/812

[56] References Cited

U.S. PATENT DOCUMENTS

| | | |
|---|---|---|
| 1,041,439 | 10/1912 | Dearborn. |
| 1,249,239 | 12/1917 | Suffolk. |
| 1,343,799 | 6/1920 | Trefren. |
| 2,166,447 | 7/1939 | Ruppenthal. |
| 2,815,849 | 12/1957 | Zumbrunnen. |
| 3,127,978 | 4/1964 | Zuercher. |
| 3,228,516 | 1/1966 | Sheehan. |
| 3,305,220 | 2/1967 | Nevulis. |
| 3,402,805 | 9/1968 | Spellman, Jr.. |
| 3,578,145 | 5/1971 | Kuehl ................................. 198/812 X |
| 3,613,866 | 10/1971 | Arndt. |
| 3,826,353 | 7/1974 | Greasley. |
| 3,835,980 | 9/1974 | Brooks, Jr.. |
| 3,945,484 | 3/1976 | Oury. |
| 4,312,540 | 1/1982 | Thompson. |
| 4,392,573 | 7/1983 | Gyomrey. |
| 4,406,375 | 9/1983 | Hockensmith. |
| 4,425,069 | 1/1984 | Saur et al.. |
| 4,474,287 | 10/1984 | Belanger. |
| 4,643,299 | 2/1987 | Calundan. |
| 4,780,041 | 10/1988 | Ashby, Jr. ........................... 198/588 X |
| 4,813,526 | 3/1989 | Bélanger ............................ 198/313 |
| 4,860,878 | 8/1989 | Mraz et al.. |
| 4,946,027 | 8/1990 | Jenkins. |
| 5,009,560 | 4/1991 | Ruder et al.. |

(List continued on next page.)

FOREIGN PATENT DOCUMENTS

| | | | |
|---|---|---|---|
| 1018794 | 10/1957 | Germany .............................. | 198/588 |
| 1134025 | 6/1962 | Germany .............................. | 198/594 |
| 2012552 | 10/1970 | Germany .............................. | 198/594 |
| 0464765 | 8/1951 | Italy ..................................... | 198/588 |

OTHER PUBLICATIONS

U. S. patent application Ser. No. 08/054,106 filed Apr. 26, 1993, by Phillip J. Gilmore for Multiple-Stage Extendable Conveyor.

Primary Examiner—James R. Bidwell
Attorney, Agent, or Firm—Van Dyke, Gardner, Linn & Burkhart

[57] ABSTRACT

An extendable conveyor unit eliminates the necessity of a base unit by supporting the extendable units directly from the warehouse floor with a minimum amount of support structure. The extendable conveyor includes one or more extendable units, a stationary support for supporting the extendable units, and a conveying surface defined on an extended portion of the extendable units. The stationary support supports the extendable units between a fully extended position, wherein the extendable units extend from the support in the direction of the vehicle to be loaded and a fully retracted position in which the extendable units extend from the support in a direction opposite from the direction of the vehicle to be loaded. The conveying surface may be a gravity roller conveyor or it may be an endless belt. When the conveying surface is an endless belt, an elevating unit may be provided with the stationary support in order to elevate the conveying member above the extendable unit at the stationary support to match up with a discharge or receiving conveyor. A cable routing system to the extendable units includes an electrical cable running between the stationary support and an extendable unit over a sheave mounted to another extendable unit with the extendable units extended at a rate that maintains tension on the cable for all extendable positions of the extendable units.

48 Claims, 8 Drawing Sheets

U.S. PATENT DOCUMENTS

| | | |
|---|---|---|
| 5,046,603 | 9/1991 | Odenthal . |
| 5,067,867 | 11/1991 | Ruder et al. . |
| 5,193,660 | 3/1993 | McKernan et al. . |
| 5,203,442 | 4/1993 | Oury et al. . |
| 5,307,917 | 5/1994 | Hall . |
| 5,325,953 | 7/1994 | Doster et al. . |
| 5,351,809 | 10/1994 | Gilmore et al. ............... 198/594 X |

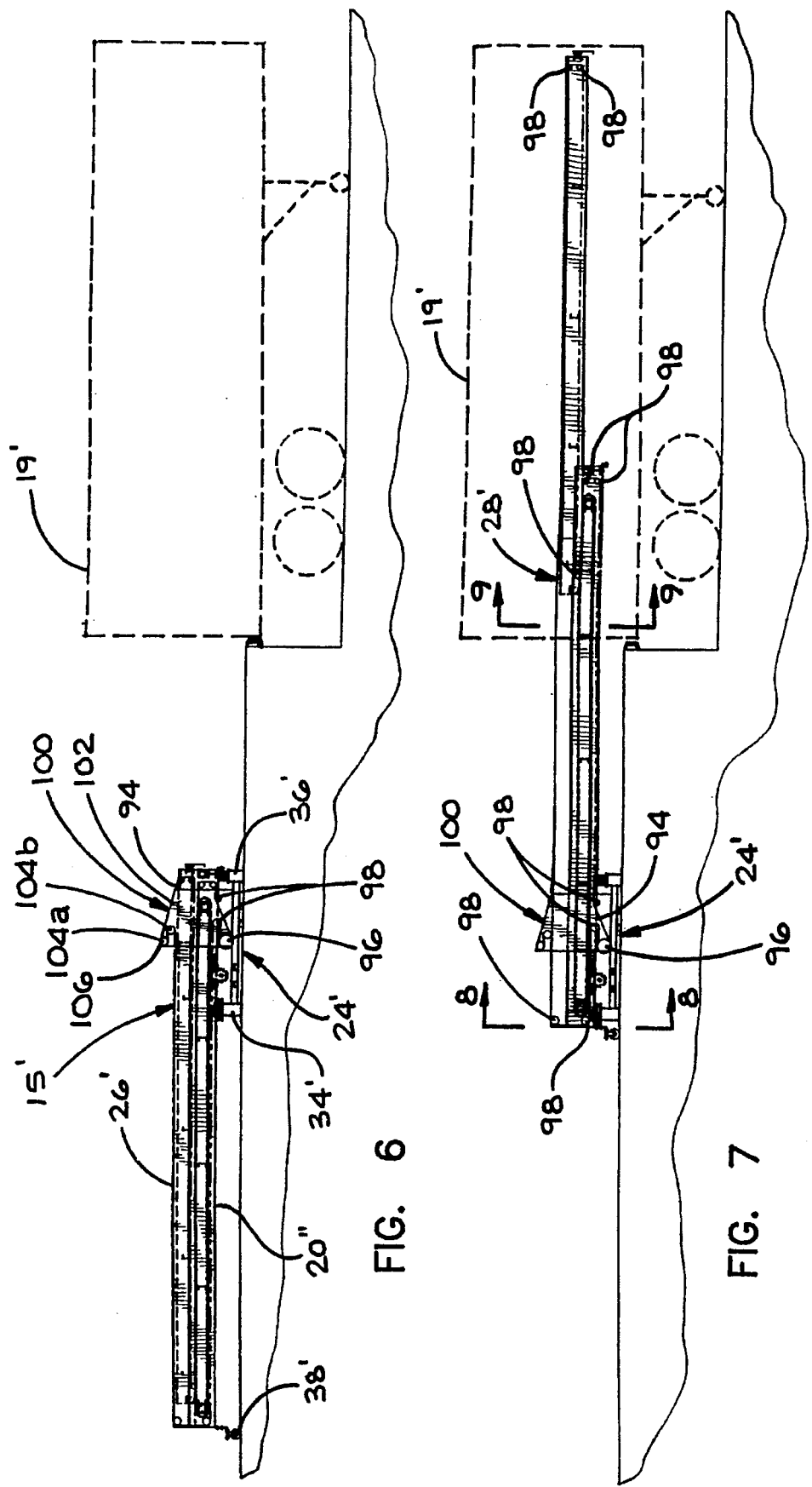

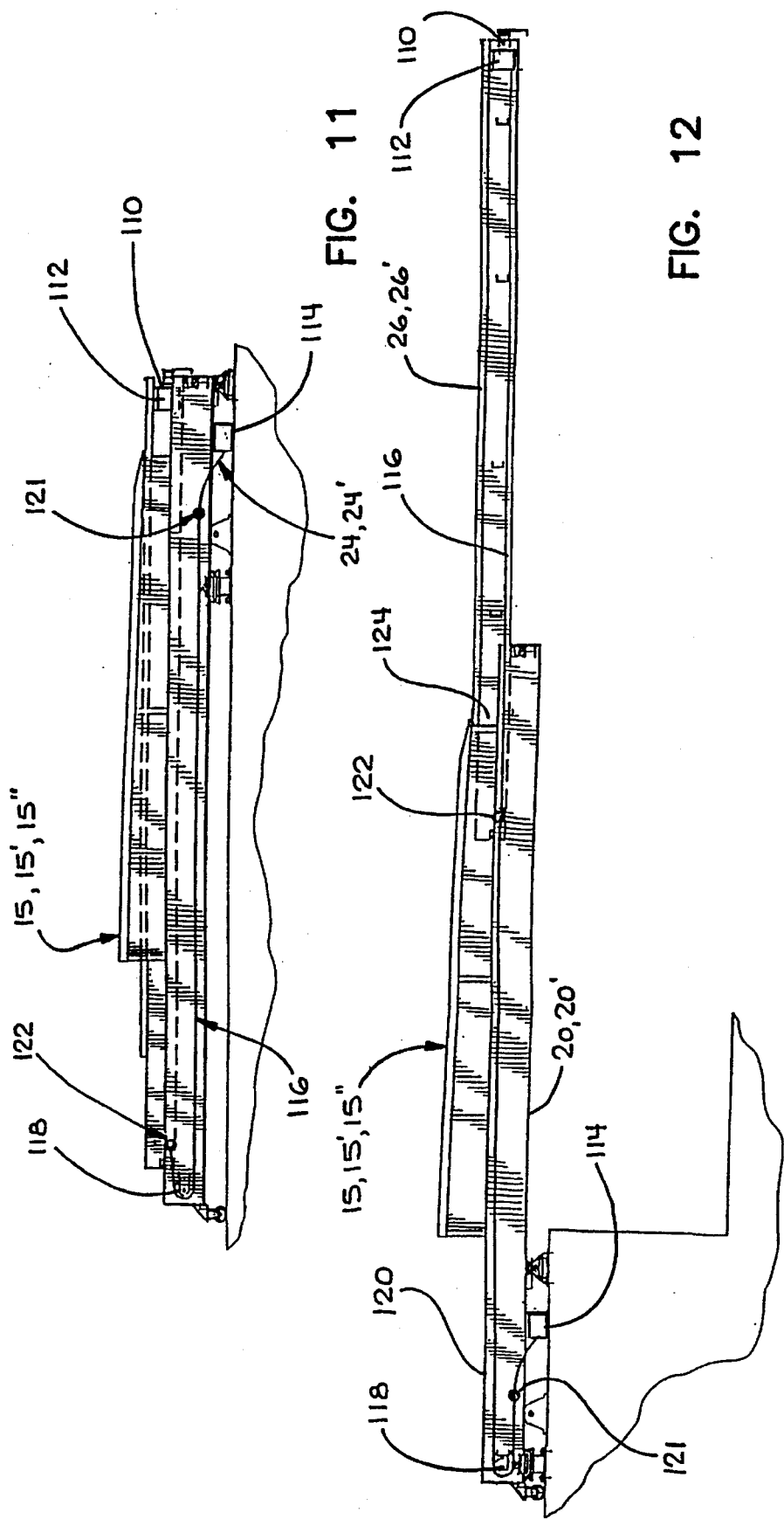

EXTENDABLE CONVEYOR WITHOUT BASE UNIT

This is a division of application Ser. No. 08/131,198, filed Oct. 1, 1993, now U.S. Pat. No. 5,423,413.

BACKGROUND OF THE INVENTION

This invention relates generally to conveyors and, more particularly, to extendable conveyors for loading product to, or unloading product from, a truck trailer or the like.

Retractable conveyors are permanently mounted to a warehouse dock area in the vicinity of a loading door and are incrementally extendable into the cargo area of a trailer truck. Such extendable conveyors have been provided for loading product onto the truck, in which case the conveyor may be a gravity fed roller conveyor or a driven endless belt conveyor. Such extendable conveyors have also been provided for unloading product from the trailer, in which case the conveying surface is a driven endless belt.

The prior art extendable conveyors include a base unit that is anchored to the warehouse floor and two or more extendable units which nest in the base unit when the extendable units are in a fully retracted position. The base unit typically includes horizontal support channels in order to guide the extendable units in extending and retracting movements and to bear the cantilever load of the extendable units, as well as sheet metal members in order to enclose the base unit.

Extendable conveyors in the past have utilized cable reels in order to pay out control and power electrical cables to the extendable end of the conveyor and to reel in the slack in the cables as the conveyor is retracted. Such take-up reels have been a source of equipment failure and complexity resulting from intermittent electrical connections in the commutator set.

SUMMARY OF THE INVENTION

The present invention is intended to provide an extendable conveyor that does away with the necessity of a base unit and supports the extendable units directly from the warehouse floor with a minimum amount of support structure. An extendable conveyor according to the invention for conveying product between a particular location and a selectable variable location includes one or more extendable units, a stationary support for supporting the extendable units and a conveying surface defined on an extended portion of the extendable units. The stationary support supports the extendable units between a fully extended position wherein the extendable units extend from the support in the direction of the truck to be loaded and a fully retracted position in which the extendable units extend from the support in a direction opposite from the direction of the vehicle to be loaded. In this manner, the requirement for a base unit into which the extendable units are nested in a fully retracted position is eliminated. Furthermore, the necessity for elongated horizontal support channels, that are approximately the length of the extendable unit, is eliminated.

The extendable units may be made longer without adding commensurately to the cost of the overall unit because there is no base unit that must be made as long as the extendable units. By allowing the extendable units to be made longer, the interior portions of a truck trailer may be easily reached while allowing the support to be set back from the edge of the loading dock. This allows the provision of an aisle-way between the support and the warehouse wall to allow loading vehicles to traverse the line of the extendable conveyors.

The conveying surface may be a gravity roller conveyor, in which case the extendable conveyor is a trailer loader. The conveying surface may alternatively be an endless belt, in which case the extendable unit may be made as either a trailer loader or an unloader. When the conveying surface is an endless belt, an elevating unit may be provided with the stationary support in order to elevate the conveying member above the extendable unit at the stationary support. This allows the conveying member to match up with a discharge or receiving conveyor.

According to another aspect of the invention, an extendable conveyor having at least first and second extendable units, a support to extendably support the first extendable unit from a stationary surface, means for extendably supporting the second extendable unit from the first extendable unit and extension drive means for extending the first extendable unit from the support and the second extendable unit from the first extendable unit are provided with a unique system for routing electrical power and control cables to the remote end of the second extendable unit. The cable routing system includes a first electrical terminal on the stationary surface and a second electrical terminal on the remote end of the second extendable unit with an electrical cable between the first and second electrical terminals. The control cable extends over a sheave that is attached to the end of the first extendable unit opposite the remote end of the second extendable unit. The extension drive means extends the second extendable unit at a rate that is twice the rate that it extends the first extendable unit. In this manner, the electrical cable is tensioned for all extendable positions of the extendable units without the requirement of an unreliable take-up reel. This unique cable routing system may be applied, according to a further aspect of the invention, to extendable conveyors having any multiple of two extendable units.

These and other objects, advantages and features of this invention will become apparent upon review of the following specification in conjunction with the drawings.

BRIEF DESCRIPTION OF THE DRAWINGS

FIG. 6 is a side elevation of a second embodiment of an extendable conveyor according to the invention;

FIG. 7 is the same view as FIG. 6 of the extendable conveyor in a fully extended position;

FIG. 11 is a side elevation of an electrical cable system according to the invention;

FIG. 12 is the same view as FIG. 11 with the extendable conveyor in a fully extended position.

DESCRIPTION OF THE PREFERRED EMBODIMENT

Figure 1:
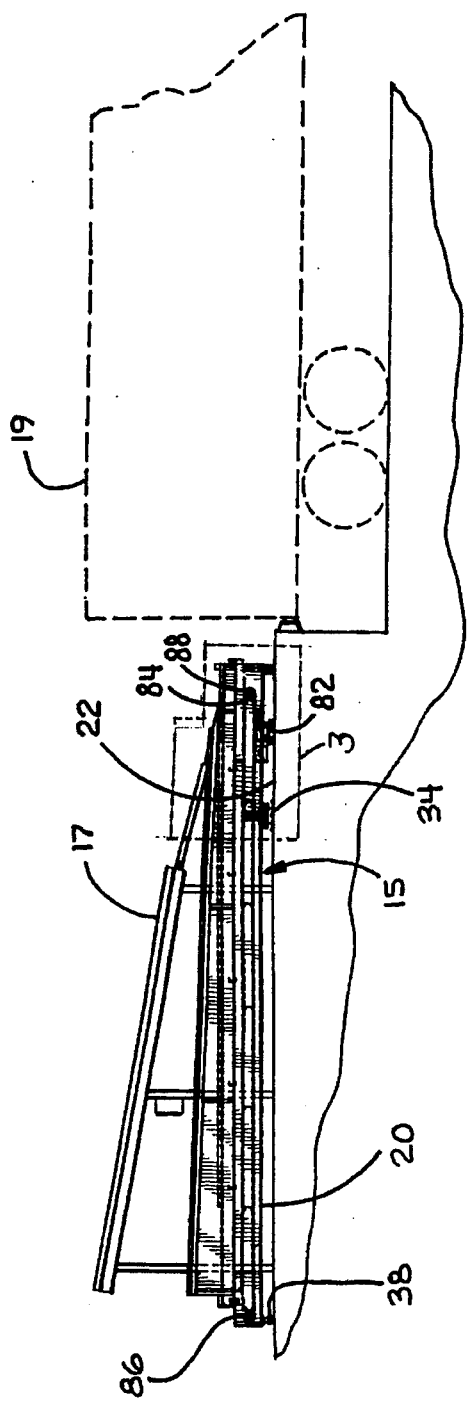
FIG. 1 is a side elevation of a first embodiment of the invention in a fully retracted position.

Referring now specifically to the drawings, and the illustrative embodiments depicted therein, an extendable conveyor 15 is provided to load packages from a feeder conveyor 17 to a trailer 19 (FIGS. 1–5). Extendable conveyor 15 includes a first extendable unit 20, which is extendably supported from a horizontal surface, such as a floor 22, by a stationary support, generally indicated at 24. Extendable conveyor 15 further includes a second extendable unit 26, which is extendably supported from first extendable unit 20. A conveying surface generally indicated at 28 is formed on the extended portions of extendable units 20, 26 by a plurality of parallel, freely rotatable rollers 30 on first extendable unit 20 and a plurality of parallel, freely rotatable rollers 32 on extendable unit 26. As may best be seen in FIGS. 2 and 3, rollers 30 are elevated above second extendable unit 26 in order to provide a slope to conveying surface 28 in the direction of trailer 19 in order to gravity feed product from feeder conveyor 17 to the trailer.

Figure 2:
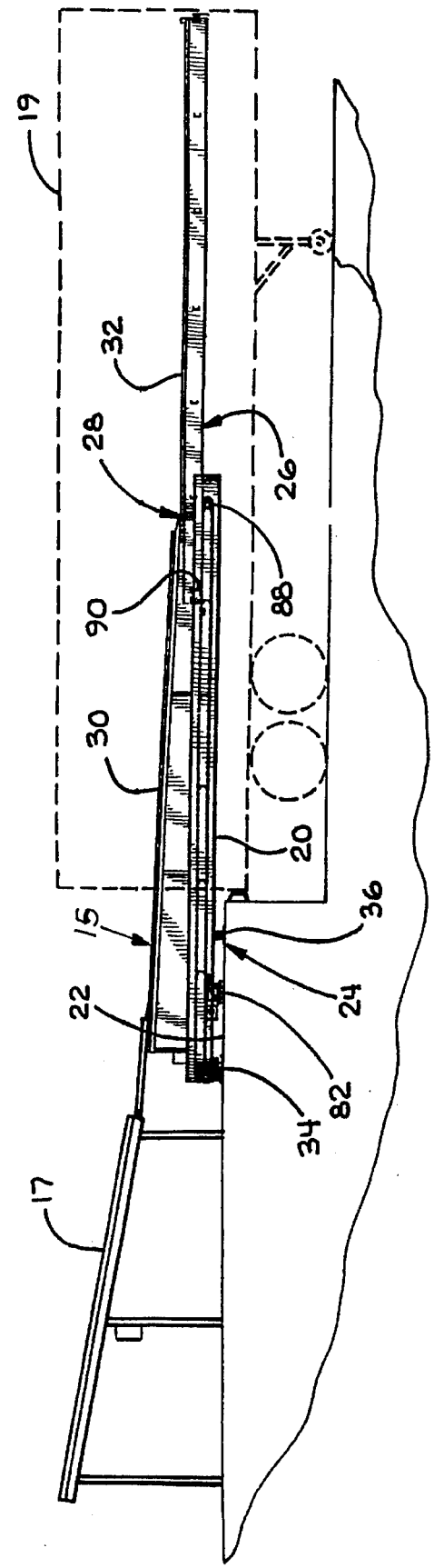
FIG. 2 is a side elevation of the extendable conveyor in FIG. 1 in a fully extended position.
Figure 3:
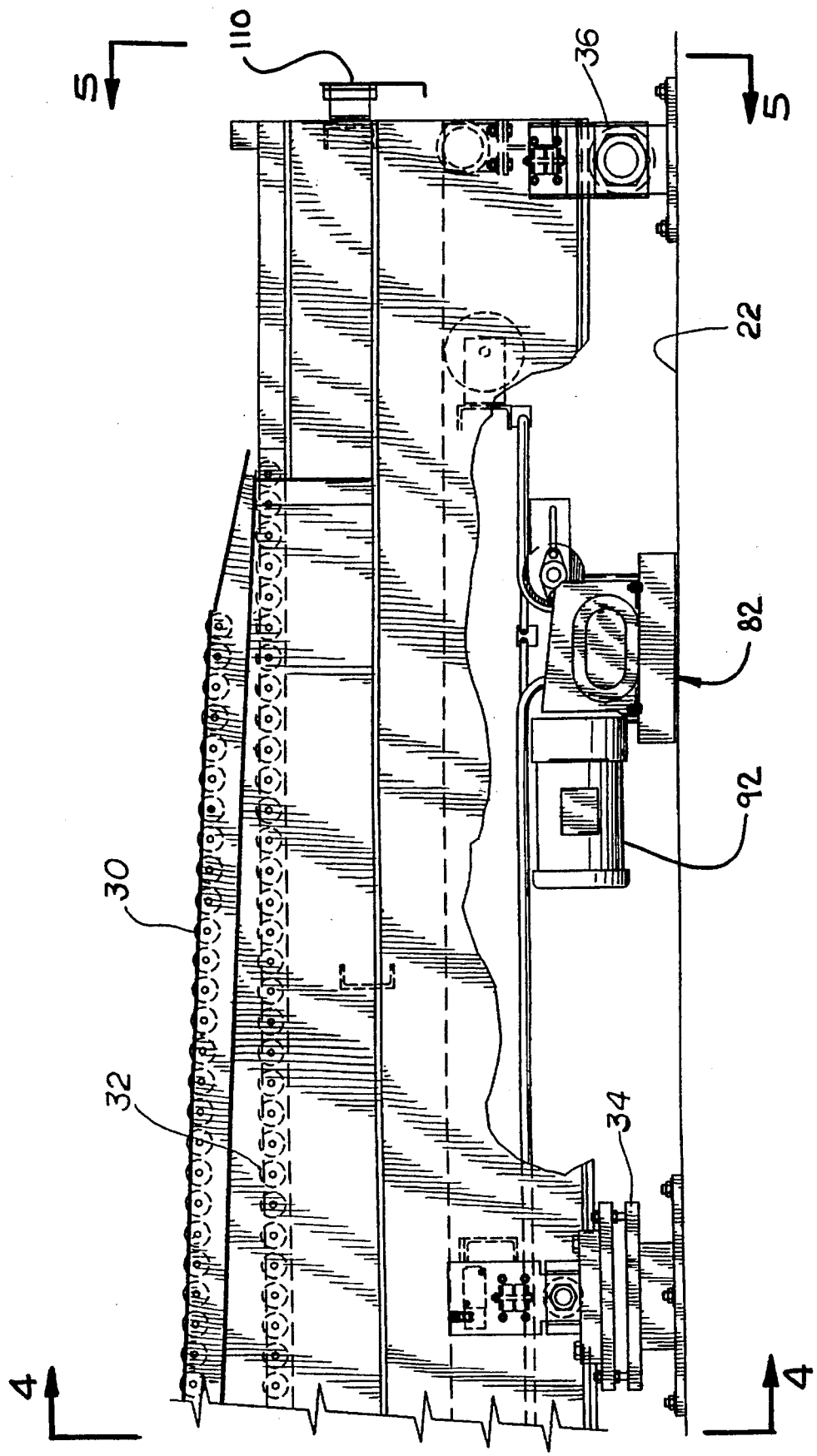
FIG. 3 is an enlarged view of the area designated III in FIG. 1.
Figure 4:
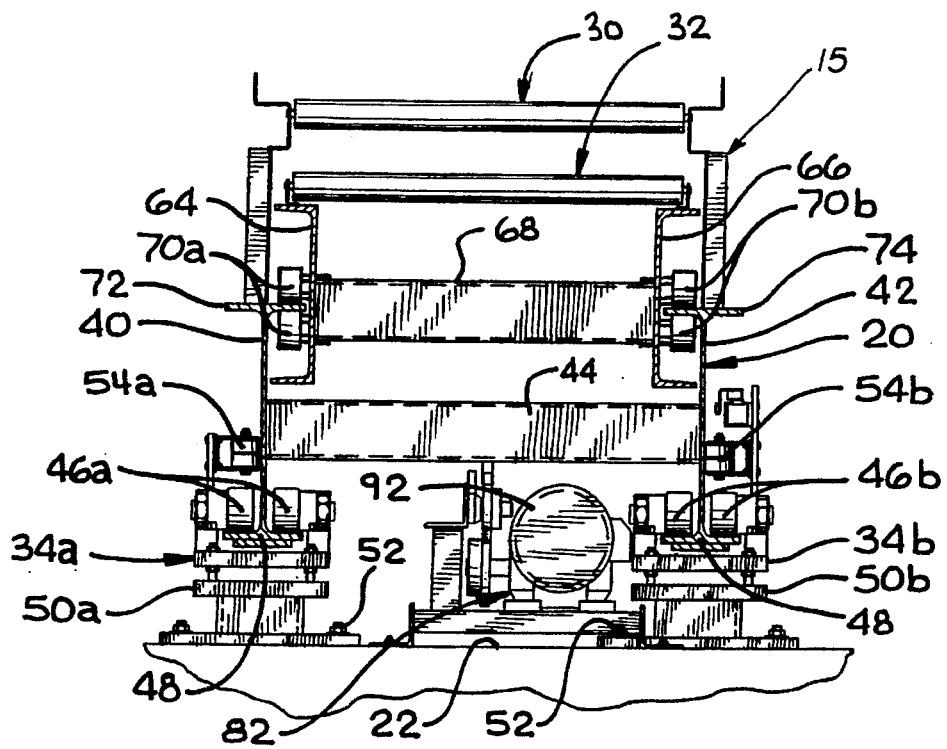
FIG. 4 is a view generally from the direction IV—IV in FIG. 3.
Figure 5:
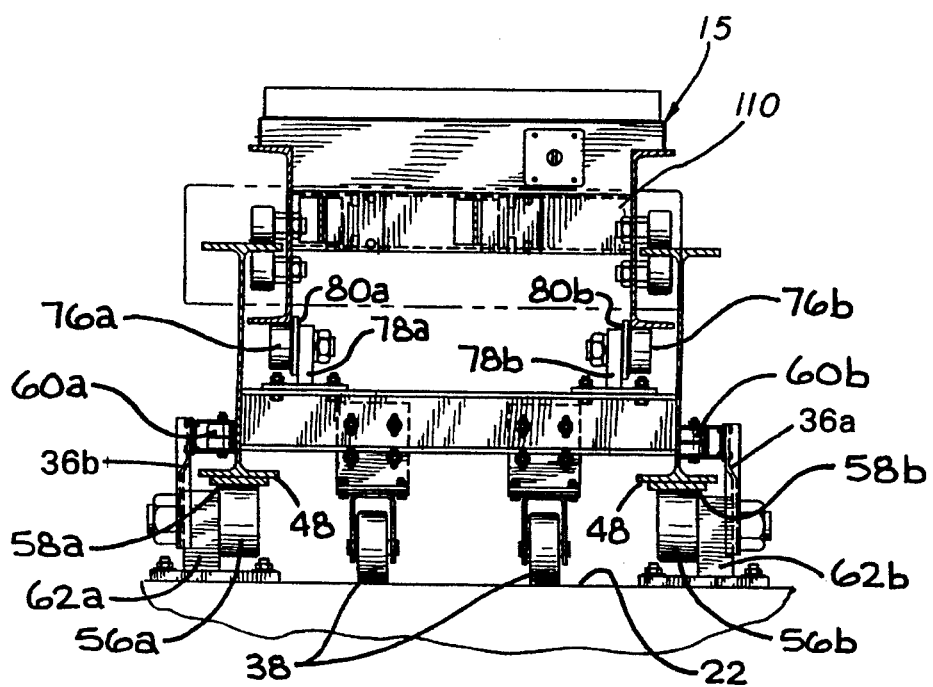
FIG. 5 is a view generally in the direction V—V in FIG. 3.
Figure 8:
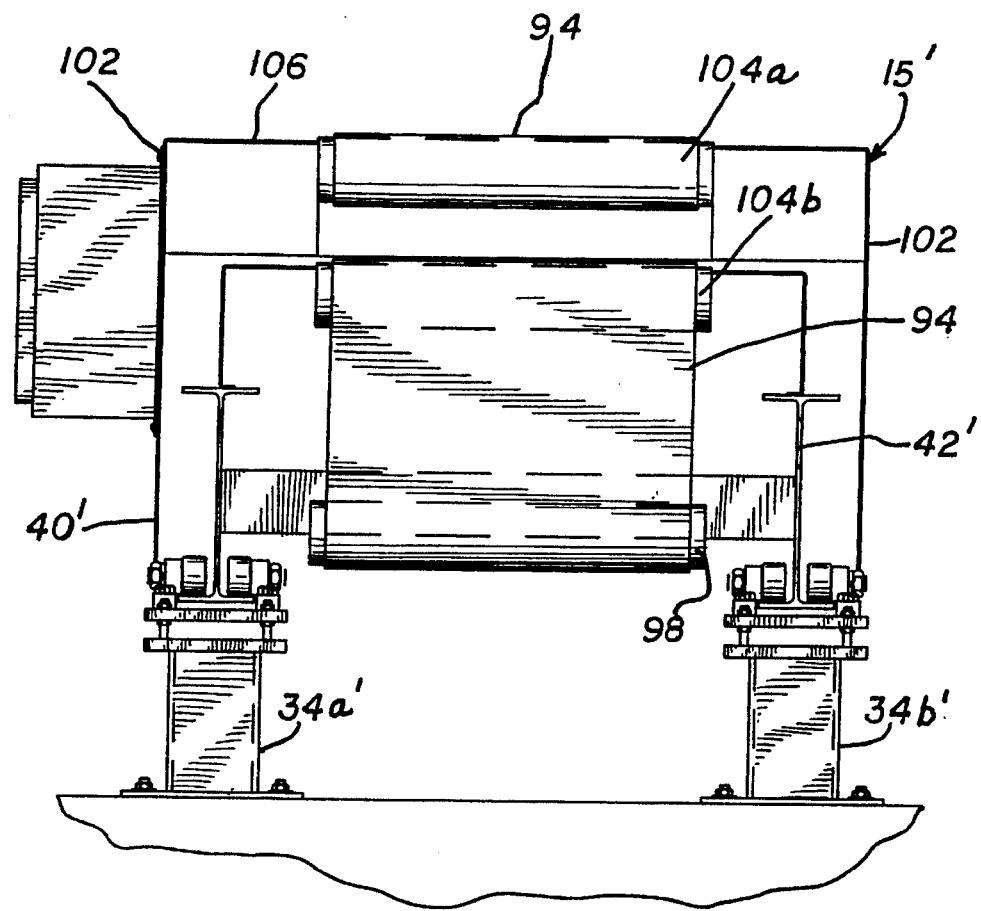
FIG. 8 is an end view taken generally from the direction VIII—VIII in FIG. 7.
Figure 9:
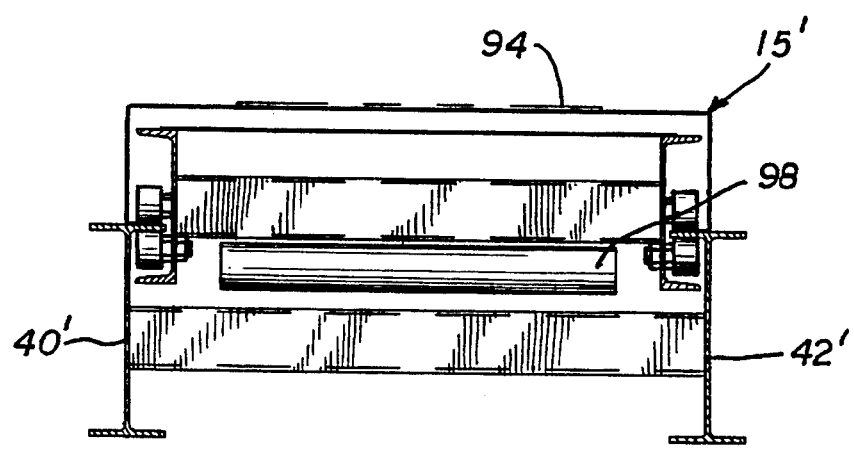
FIG. 9 is a sectional view taken along the lines IX—IX in FIG. 7.

Stationary support 24 includes a pair of rear vertical support members 34a and 34b and a pair of forward vertical support members 36a and 36b, all of which are configured to be rigidly attached to horizontal surface 22. As may be seen by comparing FIGS. 1 and 2, extendable units 20 and 26 incrementally extend between a fully retracted position, wherein the extendable units are both to the left of support 24, as illustrated in FIG. 1, and a fully extended position, as illustrated in FIG. 2, wherein the extendable units are both to the right of support 24. In the fully extended position illustrated in FIG. 2, stationary support 24 bears the cantilever load of the extendable units and any product being conveyed thereon. When in the fully retracted position illustrated in FIG. 1, a pair of casters 38 positioned at the inward end of first extendable unit 20 supports the inward ends of the extendable unit. In this manner, rear vertical supports 34a and 34b are required to bear only upward vertical forces and forward vertical supports 36a and 36b are required to bear only downward vertical forces. Casters 38 alleviates the necessity of rear vertical support 34 supporting downward forces or forward vertical support 36 bearing upward forces. First extendable unit 20 includes a pair of parallel spaced apart I-beams 40 and 42 joined by lateral braces 44 (FIG. 4), which are all structural steel members. Rear vertical supports 34a and 34b each include a pair of cam followers 46a, 46b, respectively, which bear against a web 48 of the respective I-beams 40, 42. Cam followers 46a and 46b are supported by pedestals 50a and 50b, which are bolted to horizontal support 22 by bolts 52. A pair of vertical axis cam followers 54a and 54b provide lateral alignment to the first extendable unit 20.

Forward vertical supports 36a and 36b each include a pair of cam followers 56a and 56b positioned under webs 48. Wear strips 58a, 58b positioned between the cam followers and the web ensure a smooth operating surface for the cam followers. A pair of vertical axis cam followers 60a, 60b provide lateral alignment to the forward portion of first extendable unit 20. Pedestals 62a and 62b rotatably mount cam followers 56a, 56b, 60a and 60b to horizontal surface 22.

Second extendable unit 26 includes a pair of side members 64 and 66 which, in the illustrated embodiment, are C-channel structural steel and are interconnected by lateral braces 68. The rearward portion of second extendable unit 26 is supported by cam followers 70a that interact with opposite surfaces of upper web 72 of beam 40, and 70b which interact with upper web 74 of beam 42. The forward extended portion of second extendable unit 26 is supported by a pair of cam followers 76a, 76b, which are rotatably mounted by brackets 78a and 78b. A lateral alignment flange 80a, of cam follower 76a, and 80b, of cam follower 76b, provide lateral alignment to the nose to second extendable unit 26.

An extension drive unit 82, which is mounted to horizontal surface 22, extends the first extendable unit 20 with respect to support 24 and the second extendable unit with respect to the first extendable unit at a predefined proportional rate. Unit 82 drives an elongated chain 84 that is affixed at opposite ends to the first extendable unit around sprockets 86 and 88. Chain 88 is attached to second extendable unit 26 at 90. In this manner, as extension unit 82 drives chain 84, which is guided around sprockets 86 and 88, first extendable unit 20 is extended outwardly at a predetermined rate and second extendable unit 26 is extended at a rate that is double the rate of the payout of the first extendable unit with respect to a stationary point. In the illustrated embodiment, extension unit 82 is motor operated by an electric motor 92. However, it could, alternatively, be manually operated.

Extendable conveyor 15 is capable of loading product to trailer 19. In order to unload product from trailer 19, an extendable conveyor 15' is provided (FIGS. 6–9). Extendable conveyor 15' includes a first extendable unit 20' that is supported by a stationary support 24' and a second extendable unit 26' that is supported by first extendable unit 20'. In this manner, first and second extendable units 20', 26' may extend from a fully retracted position, illustrated in FIG. 6, inwardly to the left of support 24' to a fully extended position, illustrated in FIG. 7, fully outwardly to the right of support 24'. Extendable conveyor 15' includes a conveying surface 28', which is made up of an endless, flexible, friction belt 94 that is driven by a belt drive 96. Belt 94 is reeved around rollers 98 positioned at appropriate locations on first and second extendable units 20', 26' and on stationary support 24'. As is well known in the art, by suitable placement of rollers 98, belt 94 may be kept in proper tension irrespective of the extended position of extendable conveyor 15' without the necessity for lengthy belt take-ups.

In order to position packages discharged from trailer 19' onto a receiving conveyor (not shown), a hitch or tripper 100 is provided. Hitch 100 includes side members 102, which support a pair of offset rollers 104a and 104b and an upper sloped surface 106. Side members 102 may additionally provide support for belt drive 96 and the rollers 98 associated with support 24'. Drive belt 94 extends up sloping surface 106 and down via rollers 104a and 104b in order to elevate product being returned on conveying surface 28' to an elevated position irrespective of the extended position of extendable units 20', 26'.

Figure 10:
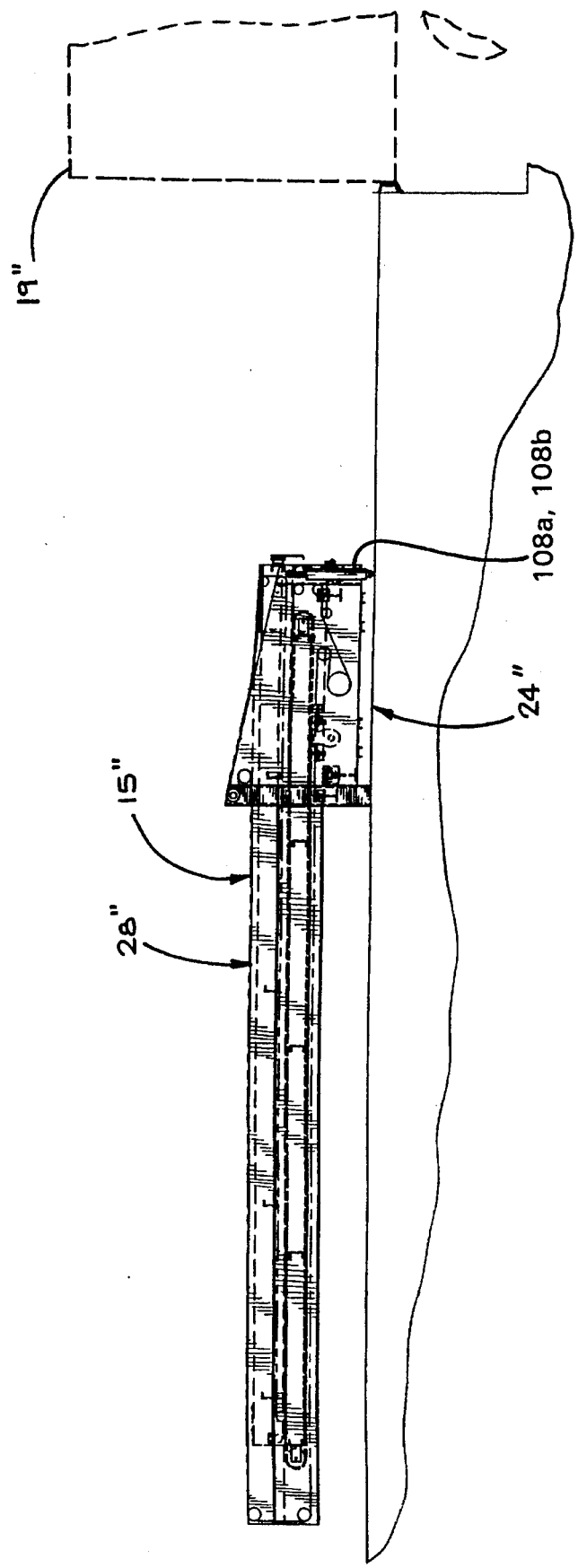
FIG. 10 is a side elevation of a third embodiment of an extendable conveyor according to the invention.

An extendable conveying 15" is illustrated in FIG. 10 in which stationary support 24" includes a pair of forward vertical supports 108a and 108b that are vertically extendable. By making forward supports 108a, 108b vertically extendable, the slope of conveying surface 28" may be adjusted with respect to trailer 19". Although illustrated with a belt conveyor, vertically adjustable forward supports 108 may be provided with a roller conveying surface to provide a gravity fed conveyor.

Extendable conveyors 15, 15' and 15" may include a control package 110 at the outward-most portion of the extended conveyor. Control package 110 may include switches to allow the operator to control the extended and retracted position of the conveyor, safety bars in order to terminate extension of the conveyor upon contacting a stationary surface, lights to illuminate the loading area, as well as a myriad of possible data control elements such as bar code scanners and the like. Control element 110 is connected with a terminal panel or box 112 which, in turn, is connected with a stationary terminal panel 114 through a control cable 116 (FIGS. 11 and 12). Control cable 116 is routed from stationary terminal panel 114 over a sheave 118 mounted to inward end 120 of first extendable unit 20, 20'. Control cable 116 is supported at 121 to a stationary member, such as support 24, 24", and at 122 to an inward end 124 of second extendable unit 26, 26'. From support 122, control cable 116 extends to terminal panel 112. As set forth in detail above, second extendable unit 26, 26' is extended outwardly at a rate that is double the rate that first extendable unit 20, 20' is extended. In this manner, tension is maintained on control cable 116 between support points 121 and 122 at all extended and retracted positions of extendable conveyor 15, 15' and 15". This is advantageous because multiple sheaves 118 may be mounted on the same shaft in order to support more than one control cable extending to control package 110. Thus, control cable 116 may be utilized for high-voltage electrical power, another for low-voltage control signals and another for digital data communication.

Figure 13:
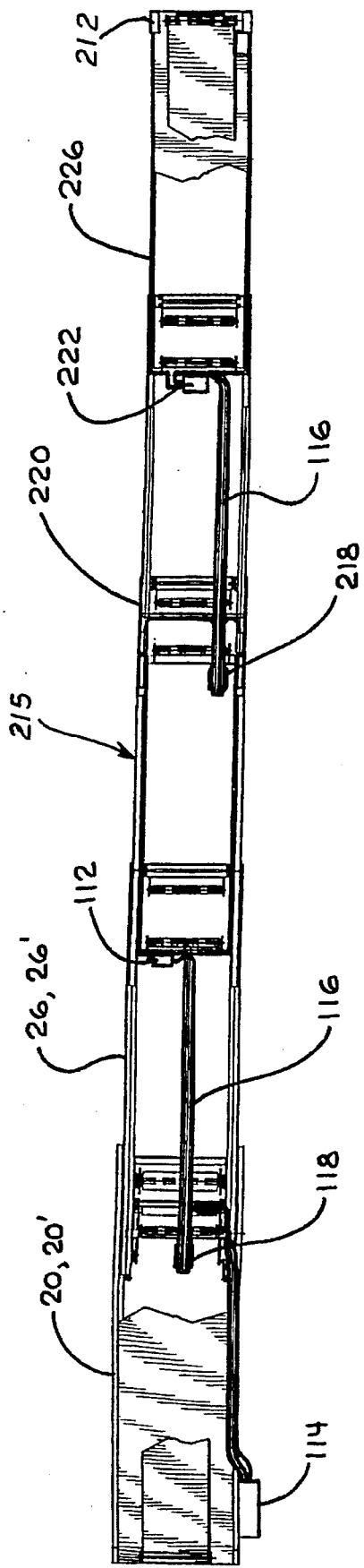
FIG. 13 is a bottom plan view of an alternative embodiment of an electrical cable system according to the invention.

Additionally, the cable routing technique illustrated in FIGS. 11 and 12 may be applied to four-unit and six-unit extendable conveyors, as illustrated in FIG. 13. For a four-unit extendable conveyor 215, control cable 116 is routed from terminal panel 114 around sheave 118 on first extendable unit 20, 20' to terminal panel 112 on second extendable unit 26, 26'. From terminal panel 112, cable 116 extends around a sheave 218 at the same position on a third extendable unit 220 as sheave 118 is on the first extendable unit. Cable 116 then extends to a support 222 on the fourth extendable unit 226 and is routed to a terminal panel 212 on the outermost end thereof. Thus, a control cable routing according to the invention may be applied to any extendable conveyor in multiples of two extendable units. Fourth extendable unit 226 will be extended at double the rate that the third extendable unit 220 is extended, which, in turn, is extended at double the rate second extendable unit 26, 26' is extended. Such an extension system is disclosed in Brooks, Jr. U.S. Pat. No. 3,835,980, the disclosure of which is incorporated herein by reference. Under all circumstances, the necessity for costly and unreliable cable reels is avoided.

Changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. An extendable conveyor for conveying product between a particular location and a selectable variable location, said extendable conveyor having at least one extendable unit, a stationary support that is configured to be rigidly attached to a support surface for supporting said at least one extendable unit and a conveying surface defined on an extended portion of said at least one extendable unit, wherein said stationary support supports said at least one extendable unit between at least a fully extended position extending forwardly from said stationary support in the direction of said selectable variable location and a fully retracted position extending rearwardly from said stationary support in a direction opposite said direction of said selectable variable location, said stationary support including a forward support portion that provides upwardly directed support for said at least one extendable unit and a rearward support portion that provides downwardly directed support for said at least one extendable unit in said fully extended position, said support portions being separated a distance that is less than one-half of the length of said at least one extendable unit to provide cantilever support for said at least one extendable unit in said extended position from a support area that is significantly shorter than said extendable unit.

2. The extendable conveyor in claim 1 including a moveable support member affixed to said at least one extendable unit in a manner to partially support said at least one extendable unit in said fully retracted position.

3. The extendable conveyor in claim 1 wherein said support portions include at least two vertical support members that are spaced apart said distance.

4. The extendable conveyor in claim 3 wherein each of said vertical support members includes a roller member that directly engages said at least one extendable unit.

5. The extendable conveyor in claim 4 wherein said roller of one of said vertical support members bears an upward vertical load and said roller member of the other vertical support bears a downward vertical load.

6. The extendable conveyor in claim 3 wherein at least one of said support members is selectively vertically extendable in order to provide adjustment of the inclination of said conveying surface.

7. The extendable conveyor in claim 1 wherein said conveying surface is a plurality of spaced parallel rollers.

8. The extendable conveyor in claim 1 wherein said conveying surface is a driven belt.

9. An extendable conveyor for conveying product between a particular location and a selectable variable location, said extendable conveyor having at least one extendable unit, a stationary support for supporting said at least one extendable unit, and a conveying surface defined on an extended portion of said at least one extendable unit, wherein said stationary support supports said at least one extendable unit between at least a fully extended position extending from said stationary support in the direction of said selectable variable location and a fully retracted position extending from said support in a direction opposite said direction of said selectable variable location, wherein said stationary support includes at least two vertical support members that span a total support distance in said horizontal direction that is significantly less than the length of said at least one extendable unit, and wherein each of said vertical support members includes a roller member that directly engages said at least one extendable unit.

10. The extendable conveyor in claim 9 wherein said roller of one of said vertical support members bears an upward vertical load and said roller member of the other vertical support bears a downward vertical load.

11. The extendable conveyor in claim 9 wherein at least one of said support members is selectively vertically extendable in order to provide adjustment of the inclination of said conveying surface.

12. The extendable conveyor in claim 9 wherein said conveying surface is a plurality of spaced parallel rollers.

13. The extendable conveyor in claim 9 wherein said conveying surface is a driven belt.

14. An extendable conveyor for conveying product between a particular location and a selectable variable location, comprising:

a stationary support that is configured to be affixed to a stationary horizontal surface;

at least two extendable units including a conveying surface on extended portions of said at least two extendable units;

wherein one of said extendable units is selectively positioned on said stationary support incrementally between a fully extended position in which a substantial portion of said at least one extendable unit extends beyond said support in a forward horizontal direction and a fully retracted position in which a substantial portion of said at least one extendable unit extends beyond said support in an opposite rearward horizontal direction;

wherein another of said extendable units is selectively positioned on said one of said extendable units incrementally between a fully extended position in which a substantial portion of said another of said extendable units is beyond said one of said extendable units in said forward horizontal direction and a fully retracted position substantially overlying said one of said extendable units; and wherein said stationary support includes at least two vertical support members that are separated a distance that is less than one-half of the length of each of said extendable units.

15. The extendable conveyor in claim 14 wherein said stationary support bears a cantilever load of said extendable units in said fully extended positions.

16. The extendable conveyor in claim 15 including a moveable support member affixed to said one of said extendable units in a manner to partially support said extendable units in said fully retracted positions.

17. The extendable conveyor in claim 14 including a moveable support member affixed to said one of said extendable units in a manner to partially support said extendable units in said fully retracted positions.

18. The extendable conveyor in claim 14 wherein at least one of said support members is selectively vertically extendable in order to provide adjustment of the inclination of said conveying surface.

19. The extendable conveyor in claim 14 wherein said conveying surface is a plurality of spaced parallel rollers.

20. The extendable conveyor in claim 14 wherein said conveying surface is a driven belt.

21. The extendable conveyor in claim 20 wherein said driven belt is supported by extended portions of said one of said extendable units and said another of said extendable units.

22. The extendable conveyor in claim 20 including an elevating unit in order to elevate said conveying member above at least one of said extendable units at said stationary support, whereby said conveying member may match up with a discharge or receiving conveyor.

23. The extendable conveyor in claim 22 wherein said stationary support bears a cantilever load of said extendable units in said fully extended positions.

24. The extendable conveyor in claim 23 including a moveable support member affixed to said one of said extendable units in a manner to partially support said one of said extendable units in said fully retracted position.

25. The extendable conveyor in claim 22 wherein each said portion is more than one-half the length of said one of said extendable units.

26. The extendable conveyor in claim 22 wherein an upper surface of said endless conveying member travels in a direction away from said selectable variable location in order to convey articles toward said particular location.

27. The extendable conveyor in claim 22 including a moveable support member affixed to one of said extendable units in a manner to partially support said one of said extendable units in said fully retracted position.

28. The extendable conveyor in claim 14 wherein each of said vertical support members includes a roller member that directly engages said at least one extendable unit.

29. The extendable conveyor in claim 28 wherein said roller of one of said vertical support members bears an upward vertical load and said roller member of the other vertical support bears a downward vertical load.

30. An extendable conveyor for conveying product between a particular location and a selectable variable location, comprising:

a stationary support that is configured to be affixed to a stationary horizontal surface;

at least one extendable unit including a conveying surface on an extended portion of said at least one extendable unit; and wherein said at least one extendable unit is selectively positioned incrementally between a fully extended position in which a substantial portion of said at least one extendable unit extends beyond said stationary support in a given horizontal direction and a fully retracted position in which a substantial portion of said at least one extendable unit extends beyond said stationary support in an opposite horizontal direction;

wherein said stationary support includes at least two vertical support members that span a total support distance in said given horizontal direction that is significantly less than the length of said at least one extendable unit; and wherein each of said vertical support members includes a roller member that directly engages said at least one extendable unit.

31. The extendable conveyor in claim 30 wherein said roller of one of said vertical support members bears an upward vertical load and said roller member of the other vertical support bears a downward vertical load.

32. The extendable conveyor in claim 30 including another extendable unit that is selectively positioned incrementally with respect to said at least one extendable unit between a fully extended position cantilevered from said at least one extendable unit in said given horizontal direction and a fully retracted position superimposed on said at least one extendable unit.

33. The extendable conveyor in claim 30 wherein said stationary support predominantly bears the load of said at least one extendable unit in said fully extended position in a cantilever manner.

34. The extendable conveyor in claim 33 including a moveable support member affixed to said at least one extendable unit in a manner to partially support said at least one extendable unit in said fully retracted position.

35. The extendable conveyor in claim 30 wherein at least one of said support members is selectively vertically extendable in order to provide adjustment of the inclination of said conveying surface.

36. The extendable conveyor in claim 30 wherein said conveying surface is a plurality of spaced parallel rollers.

37. The extendable conveyor in claim 36 including another extendable unit that includes a plurality of spaced parallel rollers and that is selectively positioned incrementally with respect to said at least one extendable unit between a fully extended position cantilevered from said at least one extendable unit in said given horizontal direction and a fully retracted position superimposed on said at least one extendable unit, wherein said conveying surface is vertically above said another extendable unit.

38. The extendable conveyor in claim 30 wherein said conveying surface is a driven belt.

39. The extendable conveyor in claim 38 including another extendable unit that is selectively positioned incrementally with respect to said at least one extendable unit between a fully extended position cantilevered from said at least one extendable unit in said given horizontal direction and a fully retracted position superimposed on said at least one extendable unit, wherein said driven belt is supported by extended portions of said at least one extendable unit and said another extendable unit.

40. The extendable conveyor in claim 38 including an elevating unit in order to elevate said conveying member above said at least one extendable unit at said stationary support, whereby said conveying member may match up with a discharge or receiving conveyor.

41. The extendable conveyor in claim 40 wherein said elevating unit includes a ramped surface sloping upwardly in said opposite horizontal direction and a pair of rollers between said ramped surface and said at least one extendable unit to return said conveying member to a level of said at least one extendable unit.

42. The extendable conveyor in claim 40 including another extendable unit that is selectively positioned incrementally with respect to said at least one extendable unit between a fully extended position cantilevered from said at least one extendable unit in said given horizontal direction and a fully retracted position superimposed on said at least one extendable unit, wherein said conveying member is reeved on said at least one extendable unit, said another extendable unit and said stationary support.

43. An extendable conveyor for conveying product between a particular location and a selectable variable location, comprising:
   a stationary support that is configured to be affixed to a stationary horizontal surface;
   at least one extendable unit including a conveying surface on an extended portion of said at least one extendable unit, wherein said conveying surface is a driven belt;
   wherein said at least one extendable unit is selectively positioned incrementally between a fully extended position in which a substantial portion of said at least one extendable unit extends beyond said support in a given horizontal direction and a fully retracted position in which a substantial portion of said at least one extendable unit extends beyond said support in an opposite horizontal direction; and
   an elevating unit in order to elevate said conveying member above said at least one extendable unit at said stationary support whereby said conveying member may match up with a discharge or receiving conveyor, wherein said elevating unit includes a ramped surface sloping upwardly in said opposite horizontal direction and a pair of rollers between said ramped surface and said at least one extendable unit to return said conveying member to a level of said at least one extendable unit.

44. The extendable conveyor in claim 43 wherein each of said vertical support members includes a roller member that directly engages said at least one extendable unit.

45. The extendable conveyor in claim 44 wherein said roller of one of said vertical support members bears an upward vertical load and said roller member of the other vertical support bears a downward vertical load.

46. An extendable conveyor for conveying product between a particular location and a selectable variable location, comprising:
   a stationary support that is configured to be affixed to a stationary horizontal surface;
   at least one extendable unit including a conveying surface on an extended portion of said at least one extendable unit, wherein said conveying surface is a driven belt; and
   wherein said at least one extendable unit is selectively positioned incrementally between a fully extended position in which a substantial portion of said at least one extendable unit extends beyond said support in a given horizontal direction and a fully retracted position in which a substantial portion of said at least one extendable unit extends beyond said support in an opposite horizontal direction;
   an elevating unit in order to elevate said conveying member above said at least one extendable unit at said stationary support, whereby said conveying member may match up with a discharge or receiving conveyor;
   wherein said stationary support includes at least two vertical support members that span a distance in said given horizontal direction that is significantly less than the length of said at least one extendable unit; and
   wherein each of said vertical support members includes a roller member that directly engages said at least one extendable unit.

47. The extendable conveyor in claim 46 wherein said roller of one of said vertical support members bears an upward vertical load and said roller member of the other vertical support bears a downward vertical load.

48. The extendable conveyor in claim 46 wherein at least one of said support members is selectively vertically extendable in order to provide adjustment of the inclination of said conveying surface.

* * * * *